3,733,385
METHOD OF MAKING CONDUCTING PLASTIC ARTICLES

Wilson Reddish, Welwyn Garden City, England, assignor to Imperial Chemical Industries Limited, London, England
No Drawing. Filed Dec. 2, 1968, Ser. No. 780,581
Claims priority, application Great Britain, Dec. 4, 1967, 55,063/67
Int. Cl. B01f 3/18
U.S. Cl. 264—105      7 Claims

ABSTRACT OF THE DISCLOSURE

A method for making conducting articles from thermoplastics materials containing no more than 2% by weight of a conducting filler comprises rotationally moulding a dry mixture of powdered thermoplastic with from 0.1 to 2% by weight of a powdered conducting filler such as carbon black and in particular furnace black. Also conducting articles made from a thermoplastic material such as low density polythene containing no more than 2% by weight of a conducting filler and having a volume resistivity of less than $1 \times 10^8$ ohms.

---

This invention relates to a method of producing conducting thermoplastic articles which contain only small amounts of a conducting filler. Considerable effort has been expended on trying to combine electrical conductivity with the mechanical properties characteristic of organic thermoplastic materials which are invariably good insulating materials. A conducting readily melt-shapeable lightweight material is of advantage in making portable articles which receive electrostatic charges during use, for example, containers which are filled with granules, powders or even paper tape, especially if these containers have to be handled or placed near electronic apparatus. It is also very important to dissipate electrostatic charge on containers which are to be filled with inflammable materials such as powders of organic plastics since high electrostatic charges can lead to ignition. Normally such electrostatic charges are dissipated readily if the conducting material has a resistivity of from $10^4$ to $10^8$ ohms cm.

Previously conducting plastic compositions have been made by mixing plastic material such as polyethylene with a conducting filler such as carbon black using a mixing method which involved at least the softening and often the melting of the plastic material. For example, powdered filler and plastic have been fed to the heated barrel of a screw extruder where the plastic melted and blended with the powdered filler. The resulting extrudate was ground to a powder which was then used in some convenient melt-shaping process such as rotational moulding. Alternatively, as described in French Pat. 1,305,140, the plastic and filler were mixed in a Banbury mixer with consequent softening or melting of the plastic component. Such mixing techniques which involve softening or melting produce very uniform dispersions of filler which is especially desirable if the filler is also a pigment or stabiliser but such mixing techniques do not result in finished articles having significant conductivities unless quite high concentrations of filler are used (normally over 20% by weight of the filler is incorporated into the plastic). However, incorporating high concentrations of filler in a plastic material seriously alters the mechanical properties of the plastic and in particular its brittleness increases. It is therefore an object of this invention to provide a method of making a tough conducting plastic article which contains only a small concentration of conducting filler.

Accordingly by this invention we provide a method of making a conducting article by rotationally moulding a thermoplastics composition at a temperature above its softening point wherein the thermoplastics composition is an intimate dry mixture of a powdered thermoplastic with from 0.1 to 2% by weight of a powdered conducting filler. By a "dry mixture" we mean a mixture in which the particles of conducting filler are freely dispersed among the particles of thermoplastic as for example is the case when the mixture has been made by tumble blending or preferably Henschel mixing and we particularly exclude mixtures made by procedures involving softening or melting the thermoplastic material such as extrusion compounding, Banbury mixing or any procedure where the conducting filler is wetted by molten or softened thermoplastic material during mixing. Dry mixtures are most easily made by tumble-blending together the conducting filler and the thermoplastic powder and articles rotationally moulded from such compositions have adequate resistivities. However, when levels of 0.5% or more of conducting filler are employed, the filler is easily rubbed from the walls of the article and when carbon black is used as the conducting filler this loss of filler is easily detected by rubbing the surface of the article with tissue paper. It is therefore preferred to use a method of mixing such as Henschel mixing in which the particles of thermoplastic and conducting filler are subjected to a more intense agitation and it is believed the agitation may be accompanied by some degree of fluidisation of the particles.

Naturally, it is preferred that the conducting fillers used in this invention should have the highest possible conductivities themselves, so metal powders would be an obvious choice. However, most metals, such as iron or copper promote degradation in plastic materials and so can only be used if the material contains sufficient degradation stabilisers or if the metal powders are coated with a layer of one of the non-degrading metals such as tin or aluminium. These non-degrading metals may also be used as the filler by themselves. In the term "conducting filler" we also include substances such as germanium or doped silicon which are sometimes referred to as semi-conducting. The various types of carbon black and powdered graphite are readily available and inexpensive, and are therefore desirable fillers for use in our invention. For example, channel blacks, lampblacks, furnace blacks and acetylene blacks may be used in this invention, but we have discovered that furnace blacks such as "Vulcan" XXX and "Vulcan" XC–72 (registered trademarks) are the most suitable and in particular our best results so far have been with "Vulcan" XC–72. Using "Vulcan" XC–72 we have been able to obtain both volume and surface resistivities as low as $5 \times 10^5$ ohms cm. or ohm respectively with carbon black concentrations which were as low as 0.5% by weight of the thermoplastic material.

Although there is apparently no simple correlation between resistivity and the concentration of carbon black in our thermoplastic compositions, it appears that resistivity increases with diminishing carbon black concentration. On the other hand we find that increasing the concentration of carbon black beyond 2% by weight not only reduces the tensile strengths of our articles and also the elongation to which they can be subjected before rupture, but it also leads to loss of filler on rubbing the article. The amount of this loss is reduced if the surface rubbed has been in contact with the metal mould during moulding, so that where the article is a hollow container for example loss of filler is most noticeable on rubbing the inside surfaces of the container. If an article can be moulded so that all its exposed surfaces are shaped in contact with the metal surfaces of the mould, then loss of filler by rubbing can be reduced.

The conditions under which the rotational moulding of the compositions should be performed and also the sizes of the thermoplastic and filler particles will vary with the particular thermoplastics and fillers chosen. Moreover, the moulding temperature chosen is determined by the melt flow index and particle size of the thermoplastic material. The higher the melt flow index or the smaller the particle size the lower is the temperature that can be used. For rotationally moulding compositions of polythene and carbon black we prefer moulding temperatures of from 300 to 450° C., a melt flow index of from 10 to 30 and particles capable of passing through a 1500-micron sieve, especially particles capable of passing through a 1200-micron sieve. It is preferred that the particles of the carbon black should have a particle size of 200 millimicrons and particles which have a particle size of 50 millimicrons are especially preferred.

The invention is illustrated by the following examples.

EXAMPLE 1

Polyethylene powder, the particles of which pass through an 800-micron sieve, was tumble blended with varying amounts of either "Vulcan" (registered trademark) or "Kosmos" BB 88H (registered trademark) carbon black as shown in the following table. The particles of the carbon black had a maximum particle size of 50 millimicrons. The resulting mixtures were then rotationally cast at 370° C. into closed cylindrical containers 4¾″ long and 1/10″ thick. The containers were removed from the moulds and allowed to cool to room temperature. One inch diameter electrodes were then stuck onto each end of the container by means of conducting fluid and the resistance between the terminals was measured. The results are listed in the following table.

| Weight percent concentration of carbon black in the polyethylene | Type of carbon black | Resistance, ohms |
|---|---|---|
| 1 | "Vulcan" XC-72 [1] | 8.5×10⁶ |
| 1 | "Vulcan" XXX [1] | 3.5×10 |
| 0.5 | "Vulcan" XC-72 | 1.0×10⁷ |
| 0.5 | "Vulcan" XXX | 1.0×10⁸ |
| 1 | "Kosmos" BB 88H [1] | 2.2×10⁹ |
| 0.1 | "Vulcan" XXX | 1.1×10¹³ |
| 0.1 | "Vulcan" XC-72 | 5.5×10¹⁴ |
| 0.5 | "Kosmos" BB 88H | 72×10¹⁴ |
| 0.1 | do | 72×10¹⁴ |

[1] "Vulcan" XC-72 or XXX and "Kosmos" BB-88H are the registered trademarks of various furnace blacks.

It was discovered that when the concentrations of carbon black were 0.5% or greater, carbon black could be removed from the surface of the article by rubbing with tissue paper. Similar containers made by rotationally moulding polythene powder containing carbon black which had been blended with the polythene in a Banbury mixer did not suffer from loss of carbon, but had resistances of the order of 10¹⁵ ohms.

EXAMPLE 2

Polythene powder capable of passing through a 1200 micron sieve and having a melt flow index of 20 (as measured by ASTM Test No. 1238–57T) was mixed for two minutes in a Henschel mixer with various amounts (as shown in Table 1) of the furnace blacks "Vulcan" XXX and "Vulcan" XC-72. For comparison a similar polythene powder was coated with carbon black by immersion of the powder in a colloidal suspension of carbon black in oil but without any intimate mixing in a Henschel mixer.

All of the compositions of polythene powder and carbon black thus made were rotationally moulded into bins closed at one end and having a regular hexagonal cross-section. The base and walls of the bins were ⅛″ thick, and the walls were 11″ high while the sides of the hexagon were 6″ in length. The rotational moulding was carried out at 400° C. for a period of nine minutes.

Strips were cut from each bin and used to determine the volume resistivity ($\rho_V$) and surface resistivity ($\rho_S$) of each bin. The results are set out in Table 1 and the resistivities were measured as follows.

Surface resistivity

A tin ring and a tin disc fitting within the ring were stuck concentrically onto a surface of the strip. The dimensions of the ring and disc were chosen so as to leave an annular gap between the disc and ring and the resistance $\rho_A$ across this gap was measured. The surface resistivity $\rho_S$ was then calculated according to the following equation:

$$\rho_S = \rho_A \int_{R_1}^{R_2} \frac{dr}{2\pi r} = \frac{\rho_A}{2\pi} e \frac{R_2}{R_1}$$

where $R_1$ = radius of disc
$R_2$ = inside radius of ring
$r$ = a radius of the annulus Volume resistivity $\rho_V$ A strip of rectangular cross-section and ⅛″ thick was cut from the bin and tin electrodes stuck to its ends by means of a conducting fluid. The resistance of the strip was then measured by a megohmmeter. This resistance was reduced to a resistivity by multiplying by the following factor, namely $A/l$ where A is the cross-sectional area of the strip and $l$ is its length.

TABLE 1

| Carbon black | Concentration expressed as percentage by weight of carbon black in the conducting composition | $\rho_v$ in ohm/cm. | $\rho_s$ in ohms |
|---|---|---|---|
| "Vulcan" XC-72 | 1 | 8.8×10⁵ | 1.6×10⁵ |
| Do | 0.5 | 7.5×10⁵ | 5.2×10⁵ |
| "Vulcan" XXX | 1 | 1.4×10⁵ | |
| Do | 0.5 | 3.7×10⁷ | |
| Do | 0.1 | >3×10¹⁴ | |
| Colloidal carbon | 1 | >3×10¹⁴ | |
| Do | 0.5 | >3×10¹⁴ | |
| Do | 0.1 | >3×10¹⁴ | |

Unfilled polythene has a volume resistivity of about 10¹⁹ ohms and a surface resistivity of about 10¹⁶ ohms.

The bins made according to this example were quite free from the problem of losing carbon, and even hard rubbing with tissue paper on the inside of the bin failed to produce any perceptible discoloration of the paper.

EXAMPLE 3

Sample strips were cut from bins made as in Example 2 and containing various concentrations of carbon black as set out in Table 2 were tested to determine their tensile yield strengths and their percentage elongations. The dimension of the strips and their tensile strengths and elongations are also set out in Table 2.

TABLE 2

| Type of carbon black and percent concentration | Width in inch | Thickness in inch | Area, sq. in. | Tensile strength in p.s.i. | Elongation, percent |
|---|---|---|---|---|---|
| 0.5% "Vulcan" XXX | 0.25 | 0.103 | 0.0255 | 978.8 | 130 |
| Do | 0.25 | 0.098 | 0.0243 | 1,358.0 | 160 |
| Do | 0.25 | 0.120 | 0.0296 | 1,231.0 | 160 |
| 1.0% "Vulcan" XXX | 0.25 | 0.085 | 0.021 | 1,555.0 | 120 |
| Do | 0.25 | 0.107 | 0.0265 | 1,186.8 | 130 |
| Do | 0.25 | 0.095 | 0.0236 | 1,634.0 | 110 |
| Do | 0.25 | 0.077 | 0.0191 | 2,303.0 | 90 |
| Do | 0.25 | 0.117 | 0.290 | 1,275.0 | 120 |
| 0.5% XC-72 | 0.25 | 0.152 | 0.0377 | | 240 |
| Do | 0.25 | 0.154 | 0.0382 | 1,243.0 | 280 |
| Do | 0.25 | 0.110 | 0.0273 | 1,045.0 | 200 |
| Do | 0.25 | 0.112 | 0.0277 | 1,770 | 180 |
| 1.0% XC-72 | 0.25 | 0.146 | 0.0362 | 1,354 | 150 |
| Do | 0.25 | 0.147 | 0.0365 | 1,358 | 175 |
| Do | 0.25 | 0.092 | 0.0228 | 1,534 | 200 |
| Do | 0.25 | 0.090 | 0.0223 | 2,150 | 300 |

Rotationally moulded polythene powder containing no carbon black has a tensile strength of about 1200 and an elongation of about 200%.

I claim:

1. In a method for making a conducting article by rotationally moulding a thermoplastics composition at a temperature above its softening point, the improvement which comprises using as the thermoplastic composition an intimate dry mixture of a powdered thermoplastic with from 0.1 to 2% by weight of a powdered conducting filler, said dry mixture being prepared by mixing the indicated components without softening or melting the thermoplastic so that the filler is not wetted by the thermoplastic.

2. In a method for making a conducting article by rotationally moulding a thermoplastics composition at a temperature above its softening point, the improvement which comprises using as the thermoplastic composition an intimate dry mixture of a powdered thermoplastic with from 0.1 to 2% by weight of a member of the group consisting of carbon black and powdered graphite, said dry mixture being prepared by mixing the indicated components without softening or melting the themoplastics so that the filler is not wetted by the thermoplastic.

3. A method according to claim 2 wherein the carbon black is furnace black.

4. A method according to claim 2 wherein the thermoplastics composition contains from 0.5 to 2% of a member of the group consisting of carbon black and powdered graphite.

5. A method according to claim 2 wherein the thermoplastics composition is made by intimately mixing powdered thermoplastic with a member of the group consisting of carbon black and powdered graphite in a Henschel mixer.

6. A method according to claim 2 wherein the particle size of the particles comprising the powdered thermoplastic is such as to allow them to pass through a 1200-micron sieve.

7. A method according to claim 2 wherein the powdered thermoplastic is powdered polythene.

References Cited

UNITED STATES PATENTS

| | | | |
|---|---|---|---|
| 2,862,806 | 12/1958 | Nestor | 264—311 |
| 3,329,751 | 7/1967 | Slicker et al. | 264—114 |
| 3,382,574 | 5/1968 | Chadwick | 264—104 |

ROBERT F. WHITE, Primary Examiner

G. AUVILLE, Assistant Examiner

U.S. Cl. X.R.

252—511; 264—114, 126, 310